Patented Mar. 17, 1931

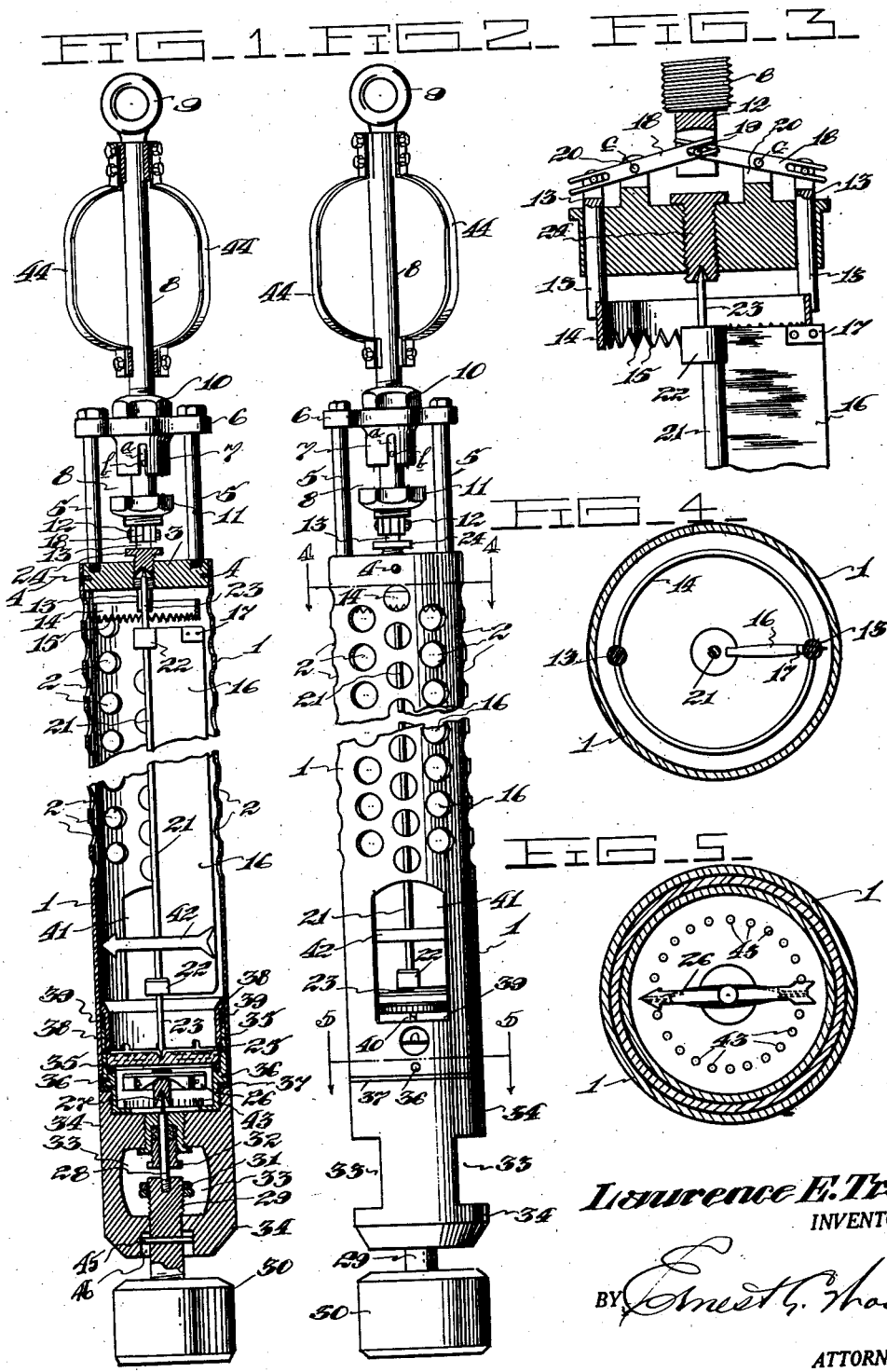

1,796,547

UNITED STATES PATENT OFFICE

LAURENCE E. TROUT, OF WICHITA FALLS, TEXAS

APPARATUS FOR INDICATING THE FLOW OF SUBSURFACE FLUIDS

Application filed December 4, 1928. Serial No. 323,696.

This invention relates to apparatus for indicating the flow of subsurface fluids and it has particular reference to an apparatus designed to be lowered into oil, water or gas wells and from which a reading may be obtained indicating the direction taken by the fluid in its underground passage, and the principal object of the invention resides in the provision of an apparatus broadly for the purposes specified and particularly useful in geological surveys for oil bearing strata as well as for water or gas.

Another object of the invention resides in the provision of an apparatus of the character specified by which a fixed reading may be obtained of the direction in which the fluid is flowing, thereby rendering it possible to dig or drill a well with reasonable assure of production within the area indicated by the pointer provided in the apparatus.

Another object of the invention is to provide a means for indicating the presence of a porous medium or stratum capable of carrying or permitting the flow therethrough of fluids, either liquids or gaseous.

The invention further aims among its objects the provision of an indicator of the character specified capable of registering with maximum efficiency, the highest structural point in a porous medium through which has been drilled a new well, since gravity and back pressure from volatile products are the then prime moving factors, that is to say, the invention, when lowered into a new well, is capable of obtaining true and fixed readings of the natural movements of the fluid which have not been disturbed by pumping.

Broadly, the invention comprehends the provision of an apparatus which is particularly useful in prospecting for oil bearing sands, success in which has been heretofore purely speculative and consequently very expensive, due primarily to the fact that no dependable readings could be obtained of the subsurface formations, the presence of oil bearing porous medium, or the direction in which the fluids were flowing. In providing means for determining the direction in which the fluid is flowing, as accomplished by the present invention, the prevailing uncertainty in prospecting for oil, gas and water is reduced materially, since after a test well has been drilled disclosing the presence of fluid, little difficulty is encountered in determining the most advantageous location for another and more productive well.

With the foregoing objects as paramount, the invention has particular reference to its salient features of construction and operation of parts, to become manifest as the description proceeds, taken in connection with the accompanying drawings, wherein;

Figure 1 represents an elevational view in vertical section of an apparatus constructed according to the present invention.

Figure 2 is an elevational view thereof.

Figure 3 is a detail view in section of the means actuated by the movements of the apparatus for locking the vane.

Figure 4 is a sectional view on lines 4—4 of Figure 2, and

Figure 5 is a sectional view on lines 5—5 of Figure 2.

The capability of the invention in performing according to the objects set out in the foregoing is manifest in combining a means against which the fluid acts and is moved to a position parallel to the flow of such fluid; a means apart from the first means and having a point indicating a common direction, which is unaffected by the action of the fluid, together with means for locking both first named means in position, and the position of the first means, as compared with that of the second means, after each has been fixed in position, will disclose the direction in which the fluid is flowing.

Accordingly, the invention consists primarily of a barrel 1 having therein a series of perforations 2 through which fluid may pass unrestrictedly when the apparatus is lowered into a well. A plug 3 is held by screws 4 in the top of the barrel 1, in which is threaded at diametrically opposite points bolts 5. A cross head 6, having a boss 7, slotted at a, supports the structure through its connection with bolts 5.

The structure is suspended in the well by rod 8, having a looped end 9 to which may be attached a cable, or other suitable means, the end of rod 8 passing through cross-head casting 6. There is however, a limited amount of vertical movement of the structure on rod 8, through the cross-head 6, which movement is limited by nuts 10 and 11 on either side of the cross-head, and to prevent undue turning of the structure on the rod 8, a pin $b$ is affixed to the rod and co-operates with slot $a$.

The advantage of this limited vertical movement may be understood by reference to Figure 3, in which is shown a portion of the threaded end of rod 8, arranged to receive nut 11, and having on its extreme end a reduced, bifurcated portion 12, opposing which are arranged in parallel relationship, short rods 13, capable of free movement through plug 3 in the top of barrel 1. The lower ends of these rods have affixed thereto a ring-like element 14, having a toothed or serrated edge 15, which, upon movement of the member 14, caused by vertical movement of rods 13, locks the vane 16, by engagement with its top at the reinforcement 17.

Returning to Figure 3, it is noted that a pair of co-operating links 18, are engaged at their ends to a pin 19 in the bifurcated portion 12 of suspension rod 8 and at their opposite ends to the tops of each of the short rods 13, as shown. The slotted ends of these links allow for limited displacement of the links, and this, together with the fact that the links are pivoted intermediate their ends at $c$ to vertical studs 20, cause the serrated member 14 to move toward and from the top of vane 16 during the limited movement permitted by the structure upon the suspension rod 8, as previously explained. As the description proceeds however, this feature of the invention will be more completely described.

The vane 16, as apparent in Figure 1, is disposed vertically, and is secured to a rod 21, entering bosses 22, at either end from which extend pivots 23, the upper of which enters the recessed bearing 24, which is in the form of a threaded cap screw, to provide means for adjusting the tension upon the pivot. The lower of these pivots enters a central recess and provided to afford a hardened bearing for the pivot, and further, to render visible the compass therebelow, which is comprised of magnetic pointer 26 suspended upon a needle 27, the latter being connected by means of a pin 28 and rod 29 to a weight 30 below the barrel 1. Adjustable stops 31 are threadedly mounted on rod 29, as apparent in Figure 1, to relieve any strain upon the delicate mechanism of the compass caused by suspension of weight 30 when the apparatus is lifted. Access is gained to these stops, as well as to the packing gland 32, below the compass, through ports 33 on either side of the lower portion 34, connected to the barrel 1 by means of its threaded connection with compass housing 35, containing also the frangible plate 25, which in turn is connected to barrel 1 by set screws 36. A packing gland 37 is provided at the joint between the barrel and portion 34 just described.

Reposing within an annular recess in a collar 38, immediately above the frangible plate 25 is a circular scale 39, bearing letters indicative of the four points of the compass, one of which is represented at 40 in Figure 2, and which are exteriorly visible through openings 41 on either side of barrel 1. Divisional lines intermediate the four major points on the scale 39, provide a common means by which a precise reading may be obtained of the geometrical condition of sand bearing oil, water or gas within the immediate vicinity of the point where the apparatus is lowered into the earth, by the corresponding positions of the pointer 42, affixed to the vane 16, and the compass pointer 26, normally indicating north. The means provided for locking the compass pointer 26 in position preparatory to withdrawing the apparauts for reading is shown in Figure 5 and comprises a circular arrangement of spaced, vertically disposed pins 43, which receive the ends of pointer 26 when the weight 30 is suspended upon raising the apparatus out of the well.

Having described in detail the various parts of the invention and their relationship, the operation thereof will be fully set forth.

The apparatus is suspended upon a cable or the like and lowered into the well, guides 44 expediting this action. When the weight of the structure is deposited upon the bottom of the hole, the weight 30 strikes first, and the lower portion 34 continues downward until stopped by lateral pin 45 operating in slot 46. This action raises the pointer 26 from locked position between pins 43, since the needle 27 is stationary with respect to weight 30, allowing the pointer to assume a position magnetic north.

Simultaneous with the action releasing the compass pointer, displacement of the rod 8 as afforded by the limited movement between nuts 10 and 11, causes the links 18 to rock upon their pivots $c$, moving rods 13 upward, elevating serrated ring 14 out of engagement with the vane 16, allowing the latter to be freely actuated by the fluid currents, as the latter flows beneath the ground surface into the well or opening in which the apparatus reposes, through the perforated barrel 1.

When the apparatus is withdrawn from the hole, reverse action to that above described is obtained to simultaneously lock the compass pointer and vane, that is to say, limited upward movement of suspension rod 8, before actual lifting of the structure begins, causes the rods 13 to be lowered through action of links 18, bringing the serrated edge 15 of ring 14 down upon the vane, locking the same, concurrent with the action at the lower end of the barrel to suspend the weight 30, withdrawing needle 27, thus allowing the pointer 26 to drop between the pins 43.

Obviously, upon withdrawing the apparatus from the well, the action of the link arrangement shown in Figure 3, and the action of the weight 30 upon the compass, will lock both the vane 16 and compass pointer 26, the latter indicating the common direction north, as compared with the direction in which the fluid is flowing, as indicated by the pointer 42 carried by the vane 16. Consequently, irrespective of any movement of the apparatus, after its removal from the well, the locked condition of the elements referred to remains intact, and the relative positions of the pointers will disclose not only the direction in which the fluid is flowing, but also will disclose by geological research, the condition, position and other peculiarities in the geological formations of the subsurface porous mediums.

The foregoing specifications reveal possibilities and purposes of the invention, all of which, together with every good and useful purpose served by the invention are deemed as rightfully within the category of its objects.

I claim:

1. An apparatus for determining the action of subsurface fluids including a barrel having fluid inlets, a direction flow indicator in the barrel, a latching device for said indicator, means for raising and lowering the barrel, automatic means connected to said raising and lowering means and to said latching device for operating the latter upon raising of the barrel, a magnetic meridian indicator, and automatic latching means to latch the meridian indicator upon raising of the barrel.

2. An apparatus for determining the action of subsurface fluids including a barrel having fluid inlets, a direction flow indicator in the barrel, a latching device for said indicator, means for raising and lowering the barrel, levers pivoted intermediate their ends to the barrel and extending radially with respect to said barrel, said levers being pivoted at their inner ends to said raising and lowering means, means connected to said latching device and pivoted to the outer ends of the levers for operating the device by the levers, a magnetic meridian indicator, and automatic latching means to latch the meridian indicator upon raising of the barrel.

3. An apparatus for determining the action of subsurface fluids, including a barrel having fluid inlets, a magnetic meridian indicator, fixed pins carried by the barrel and located beneath the indicator to latch the latter, a slidable weight carried by the barrel, and means to connect the indicator to the weight for sliding therewith whereby upon raising of the barrel the weight will gravitate and move the indicator into engagement with certain of the pins.

4. An apparatus for determining the action of subsurface fluids, including a barrel having fluid inlets, a magnetic meridian indicator, means carried by the barrel to latch the indicator, a slidable weight carried by the barrel, and means to connect the indicator to the weight whereby upon raising of the barrel the weight will gravitate and move the indicator into engagement with said latching means.

5. An apparatus for determining the action of subsurface fluids, including a barrel having fluid inlets, a magnetic meridian indicator, a slidable weight carried by the barrel, latching means for the indicator, and means to effect relative movement between the indicator and latching means upon raising of the barrel and thereby gravitation of the weight to hold the indicator against movement.

6. A device for determining the direction of flow of subsurface fluids including indicating means operable by the flow of the fluid, magnetic meridian indicating means, and automatic means for latching each of said means upon movement of the apparatus out of the range of the fluid.

7. A device for determining the direction of flow of subsurface fluids including a barrel having fluid inlets, indicating means in the barrel operable by the flow of the fluid, magnetic meridian indicating means, automatic means operable upon raising of the barrel to latch one of said indicating means, and gravity responsive means automatically operable upon raising of the barrel to latch the other indicating means.

8. An apparatus for determining the action of subsurface fluids combining a direction finder influenced by the current of said fluid and a magnetic meridian indicator; a scale common to each of said elements, and automatic means for locking said elements in fixed position when said apparatus is withdrawn from the influence of said fluid current.

9. An apparatus for determining the action of subsurface fluids combining a direction finder influenced by the current of said fluid and a magnetic meridian indicator; a scale common to each of said elements, and automatic means actuated by the weight of said apparatus to lock said elements in fixed position.

In testimony whereof I affix my signature.

LAURENCE E. TROUT.